United States Patent [19]

Kim

[11] Patent Number: 5,435,470
[45] Date of Patent: Jul. 25, 1995

[54] DISCHARGING PATH OPENING/CLOSING DEVICE OF PORTABLE VACUUM BOTTLE

[75] Inventor: Kyung-Ho Kim, Seoul, Rep. of Korea

[73] Assignee: Seohung Company, Ltd., Inchon, Rep. of Korea

[21] Appl. No.: 210,609

[22] Filed: Mar. 18, 1994

[30] Foreign Application Priority Data

Sep. 22, 1993 [KR] Rep. of Korea ............... 1993-19102

[51] Int. Cl.⁶ .............................................. B67D 3/00
[52] U.S. Cl. ..................................................... 222/509
[58] Field of Search .................... 222/507, 509, 518

[56] References Cited

U.S. PATENT DOCUMENTS

| | | | |
|---|---|---|---|
| 346,033 | 7/1886 | Fitz-Gerald | 222/509 |
| 2,122,540 | 7/1938 | Sedwick et al. | 222/509 X |
| 4,120,431 | 10/1978 | Schultz | 222/518 |
| 4,648,535 | 3/1987 | Zimmermann | 222/509 X |
| 4,676,411 | 6/1987 | Simasaki | 222/509 X |
| 4,801,053 | 1/1989 | Kaster | 222/509 X |
| 5,037,015 | 8/1991 | Collins | 222/509 X |

FOREIGN PATENT DOCUMENTS

| | | | |
|---|---|---|---|
| 89043872 | 5/1991 | Australia | 222/518 |
| 60-31622 | 9/1985 | Japan | 222/581 |
| 62-178930 | 11/1987 | Japan | 222/518 |
| 2-20976 | 6/1990 | Japan | . |
| 2176466 | 12/1986 | United Kingdom | 222/509 |

*Primary Examiner*—Andres Kashnikow
*Assistant Examiner*—Kenneth Bomberg
*Attorney, Agent, or Firm*—Ladas & Parry

[57] ABSTRACT

A portable vacuum bottle includes a discharging path opening/closing device. The device cooperates with a stopper which opens and closes the discharging device of the portable vacuum and is threadedly coupled to a discharge opening. The opening/closing device includes a path opening button and a path closing button accessible from the top surface of the stopper. A valve seat and attached resilient member facilitate the opening and closing operation of the discharging path within the stopper. An operating arm is rotately mounted in the stopper in a seesaw manner and is interposed between the path opening button and the valve seat. Another end of the operating arm is connected to the path closing button.

3 Claims, 4 Drawing Sheets

DISCHARGING PATH OPENING/CLOSING DEVICE OF PORTABLE VACUUM BOTTLE

FIELD AND BACKGROUND OF THE INVENTION

The present invention relates to a discharging path opening/closing device for a portable vacuum bottle, and more particularly to a discharging path opening/closing device for a portable vacuum bottle which is made so that there is a cooperative movement of a path closing button and a path opening button appearing on or disappearing from a top surface of a stopper of the vacuum bottle. The position of the buttons is clearly indicated and the opening and closing of discharging path is smoothly and stably operated.

A portable vacuum bottle is a container for preserving and maintaining for long time the temperature of the liquid content which may include stored water such as warm water or cold water. Such a vacuum bottle is used for drinking its stored content while carrying it, and is manufactured necessarily with many limitations in volume so it can be easy to carry along.

A vacuum bottle generally comprises vacuum insulating walls structured in double layers with internal and external walls with a suitable distance interval therebetween. A storing chamber is provided to be stored with warm water or cold water within the double structured insulating walls, and a stopper provided at the charging/discharging opening for charging and discharging the content at top of the storing chamber. A cap for separately covering exterior of the stopper is provided.

The vacuum bottle is provided with a discharging path for discharging the content within the storing chamber through the stopper, and the content can be conveniently discharged even when the stopper is not opened, by having a separate discharging path.

Japanese Utility Model publication Heisei-2-20976 shows a stopper which is structured by coupling with the internal body and external body and inserted into a charging and discharging opening in a screwlike manner. A discharging path for connecting an interior and exterior of the storing chamber is provided between the internal body and the external body of the stopper. A resilient member having an upward resilient force on top surface of the stopper is resiliently provided, and it may be opened and closed by a path opening button and a path closing button provided to appear and disappear opposite to each other.

More specifically, a valve seat is provided and is able to ascend and descend at the front surface of the stopper. When the path opening button is pressed, the valve seat is pushed down by its descending force and a path opening position is maintained. When the pressing force is released from the path opening button, it returns to original state by a restoring force of the resilient member whereby the discharging path which has been opened is made to close.

A braking structure is necessarily provided for maintaining an opened state of the valve seat. A separate braking structure for fixing and maintaining the descended position of the valve seat is required, leaving the discharging path.

This braking structure is provided with a hooking protrusion having a suitable slanted surface at the bottom end of one side wall of the path opening button, and is further provided with a braking force having a slanted surface. These surfaces are slidably contacted with each other diagonally with the hooking protrusion's slanted surface of the path opening button at the path closing button so that a braking and releasing operation is made.

When the path opening button is pressed down and descended, the path closing button is forcibly released from the hooking protrusion of the path opening button by its descending force and simultaneously it is ascended oppositely with the path opening button by a resilient member resiliently provided upwardly whereby an opened state of the discharging path is indicated by its raised height. Simultaneously with this, the descended path opening button is blocked by a braking force of the path closing button so that an opened state is maintained.

In this opening and closing structure of the stopper, the hooking protrusion of the path closing button and the hooking protrusion of the path opening button are provided by superposing on an ascending and descending path when passing each other. In case of opening and closing operation of the button, the hooking protrusions of the buttons collide with each other and are forcibly and slidably contacted whereby a frictional coefficient is largely exerted. This frictional operation gives a load to the ascending and descending operation of the button whereby the opening and closing operation is not smooth. When an unreasonable force is applied to the pressing operation of the button by carelessness of a user, there has been a problem that the hooking protrusion is damaged, and the opened state of the valve seat is made to be maintained by a frictional coefficient contacted in line at the slanted surface of the hooking protrusion.

However, since its contacting force is weak and further the restoring force of the resilient member resiliently providing the path closing button to upward is operated whereby the braking state of the hooking protrusion is easily released and the discharging path which has been opened becomes to be closed, there has been a disadvantage not only of instability but also the product characteristic is lowered.

When a cap covers the stopper, the path closing button which has been maintained in an opened state of the discharging path is automatically closed by a pressing of the cap being covered. At this moment, a descending operation of the path closing button is forcibly made as described above and this forcible descending operation makes a difference to the assembling operation of the cap to be coupled to the discharging opening of the container; a meshing of teeth sometimes fails to occur. Therefore, there has been a disadvantage that the covering state is unstable and the path closing button is not closed.

SUMMARY OF INVENTION

The present invention provides a discharging path opening/closing device in a portable vacuum bottle. The bottle is made such that an opening and closing operation of a path opening button and a path closing is cooperative and these buttons move in seesaw manner so that the opening and closing of the discharging path is easily made by application of a small force.

The present invention also provides a discharging path opening/closing device in a portable vacuum bottle in which an opening and closing structure is organically constructed so that the opening and closing operation is made to be stable and exact and productivity can be improved.

The present invention provides a discharging path opening/closing device in a vacuum bottle which is made to use a stopper for opening and closing the discharging path in the portable vacuum bottle. This opening and closing device is provided with a path opening button and a path closing button appearing and disappearing opposite each other on the top surface of the stopper.

A valve seat which is provided with an upward resilient force by a resilient member and executing the opening and closing operation of the discharging path is provided to be able to freely ascend and descend at a bottom surface of the discharging path provided within the stopper. An operating arm which is freely and rotatably fixed around a separate supporting shaft between the valve seat and the path opening button and driven in a seesaw manner is provided whereby its one end is interposed between the path opening button and the valve seat, and another end is connected with the path closing button. Accordingly the opening operation and closing operation of the path opening button and the path closing button is smoothly executed.

DETAILED DESCRIPTION OF THE PREFERRED EMBODIMENTS

Hereinafter, a preferred embodiment of the present invention will be described in more detail with reference to the accompanying drawings.

Figure 1:
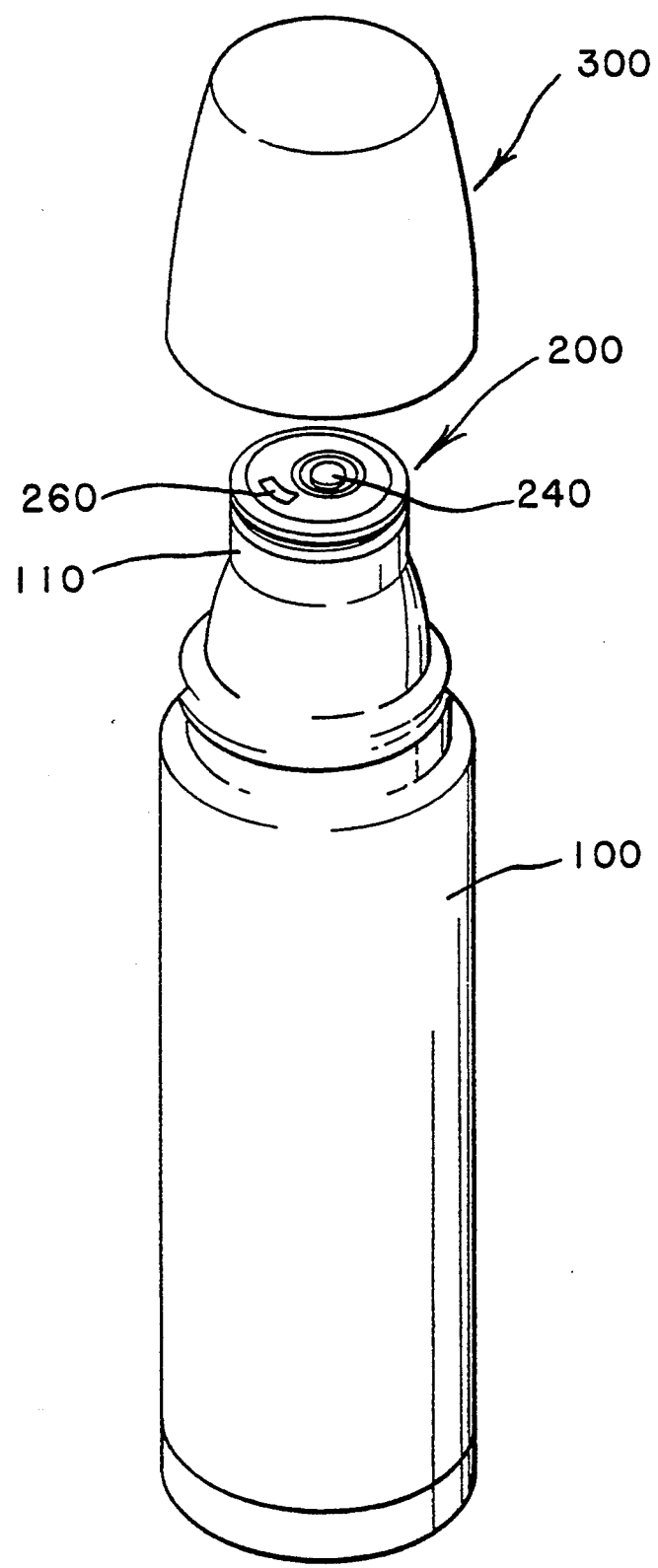
FIG. 1 is an exploded perspective view of a vacuum bottle provided with an opening/closing device in a discharging path of the present invention.

FIG. 1 shows a vacuum bottle provided with a discharging path opening/closing device in accordance with the present invention, wherein the vacuum bottle comprises a main body 100 having a thermally insulated chamber which is made of internal and external walls, a stopper 200 for opening and closing a charging/discharging opening 110 of the main body 100, and a cap 300 for covering the stopper 200.

The opening/closing device of the present invention comprises an opening and closing structure which is provided within the stopper 200 to stop or seal the charging and discharging opening 110 of the main body 100 and conveniently may discharge the content stored in the main body when the stopper is not opened.

Figure 2:
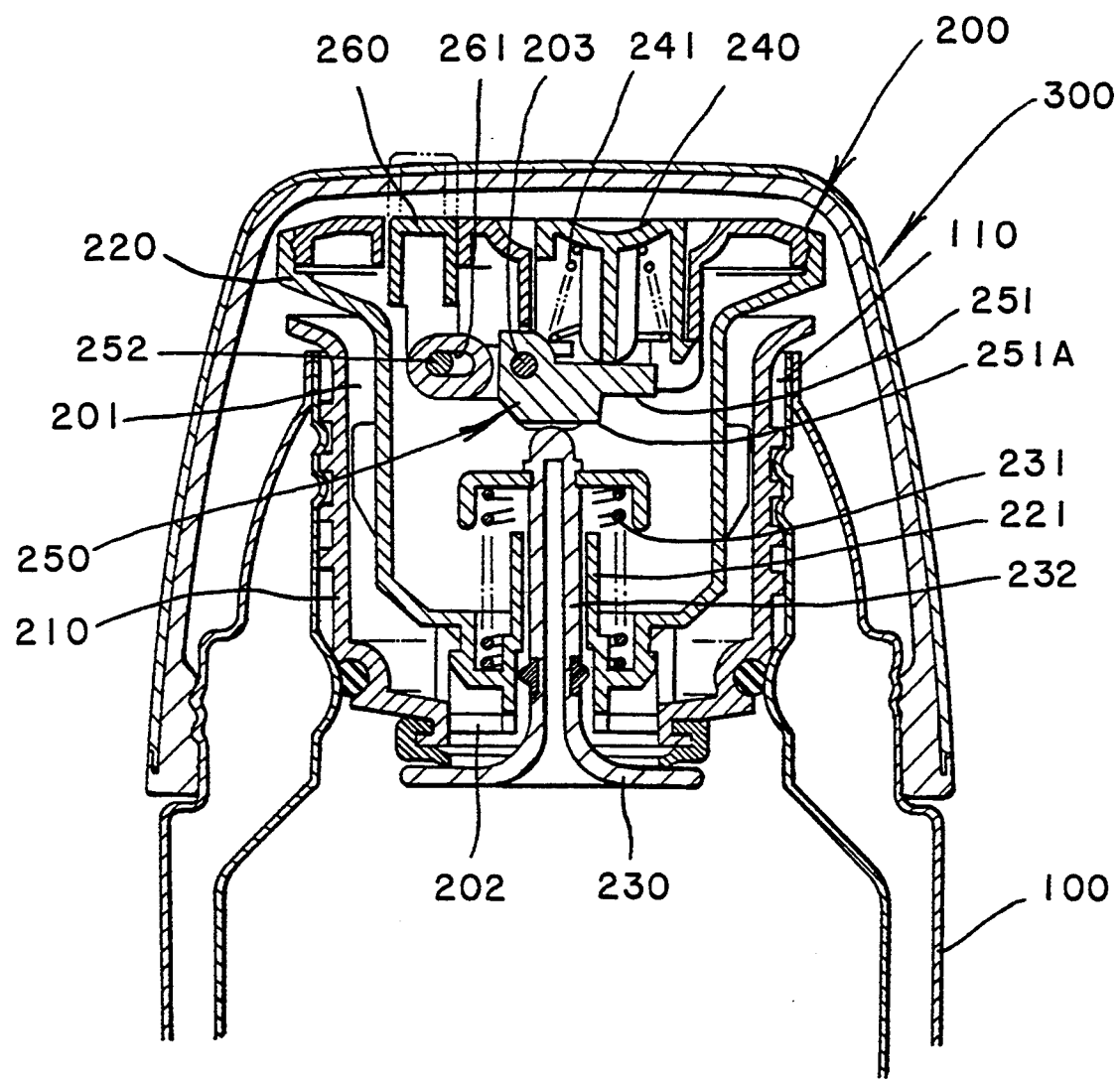
FIG. 2 is a cross sectional view showing the discharging path opening/closing device of the vacuum bottle of the present invention in a sealed position.

FIG. 2 shows in detail the structure of the stopper 200. The stopper 200 includes a cap shaped external body 210 which is open at the top surface and coupled in a screw-coupling manner to the charging/discharging opening 110 of the main body 100. An internal body 220 of hollow cylindrical shape is forcibly inserted, with a predetermined gap, within the external body 210, and the gap provided between the external body 210 and the internal body 220 is used as a discharging path 201 for discharging the contents within the storing chamber to the exterior.

A discharging opening 202 is provided at the bottom end of the discharging path 201 near the bottom surface of the stopper 200 and can be opened and closed by a valve seat 230 of bugle tube shape. This valve seat 230 is provided integrally with a guide bar 231 extending upwardly from the center of the top surface of the valve seat 230. The guide bar 232 can be freely raised and lowered in a guide tube 221 in a center portion of the internal body 220, and is resiliently held upward by a first spring 231' so that the discharging opening 202 is normally maintained in a closed position.

A path opening button 240 provides a downward force for an opening operation of the valve seat 230 and is provided on the top surface of the stopper 200 at a position slightly to one side thereof. This path opening button 240 is resiliently moved upwardly by a second spring 241 so as to appear and disappear on the top surface of the stopper 200.

An operating arm 250 is provided and is rotatably fixed within a limited extent of an acute angle of approximately 60 degrees around a separate shaft 203. The operating arm 250 is provided at a suitable position in relation to the walls of the internal body 220 of the stopper 200, i.e., at a position slightly removed from the ascending and descending path of the path opening button 240 so that a seesaw movement of the operating arm 250 is created between the path opening button 240 and the valve seat 230.

The operating arm 250 is a power transferring medium for transferring a descending force of the path opening button 240 to the valve seat 230. More specifically, when the path opening button 240 is pressed down, the operating arm 250 is rotated clockwise around the shaft 203, and this clockwise rotational force presses down the valve seat 230 which is in contact with bottom surface of one end of the operating arm 250, thereby opening the discharging opening 202 which is normally closely sealed.

The valve seat 230 is pressed down, and this downward motion is eventually stopped by a lock groove 251 provided on the operating arm 250 and located on an approximately diagonal line thereby maintaining a path open position.

The lock groove 251 on the operating arm 250 is located at one side of the rotational center of the shaft 203 of the operating arm 250. One side corner 251A of the lock groove 251 approaches the rotational perpendicular center line of the shaft 203 so that a force being counterclockwise to the operating arm is offset by a rotating force of the first spring 231, which has supported the valve seat 230. Thus, the operating arm and valve seat are maintained so that the discharging opening 202 is in an open position.

A path closing button 260 is provided for up and down movement and appears and disappears in the same direction but at a position slightly removed from the path opening button 240 provided at top surface of the stopper 200. This path closing button 260 has a desired path open indication. It has a path closing operation and appears and disappears in the same direction as that of the path opening button 240, and the path closing button 260 operates oppositely to the path opening button 240 at the top surface of the stopper 200. Its protruded shape would be utilized as an indicating means for showing an open position of the discharging path.

The path closing button 260 is provided on top surface of the stopper 200 to appear and disappear at a suitable height to perpendicular direction from its top surface. The path closing button 260 is connected with a connecting shaft 252 provided at an end of the operating arm 250 by means of an operating hole 261, and an ascending and descending motion of the path opening button 240 is transferred through the operating arm 250, to appear and disappear respectively, and cooperatively moves oppositely to the path opening button 240. The path closing button 260 appears and disappears on the top surface of the stopper 200 in a perpendicular direction from the stopper's top surface. As for the path closing button 260, a rotating force generated upon rotating of the operating arm 250 cooperatively moving with the descending operation of the path closing button 260 is changed to a vertical linear movement which pushes up the path closing button 260, and the path closing button pushed up protrudes on the top surface of the stopper so that the path open position is indicated.

When the protruding path opening button 240 is pressed down, this pressing down force required is a rather bigger force than the upward resilient force of the first spring 231 which presses the path opening and closing button. When the path closing button is pressed down, the lock groove 251 of the operating arm 250 is released away from the top end of the valve seat, one end of the lock groove 251 is ascended, and this ascending movement causes the operating arm 250 to be released from the valve seat 230. The first spring 231 pushes the valve seat 230 upwardly and thereby the discharging opening is automatically closed.

The operation of the stopper opening and closing device will be described in detail with reference to FIG. 2 and FIG. 3. FIG. 2 is a normal or carrying state of the vacuum bottle, wherein the valve seat 230 closely seals the discharging opening 202 within the stopper 200 by an ascending force of the first spring 231 to close the discharging opening so that a discharging of the content is prevented.

Figure 3:
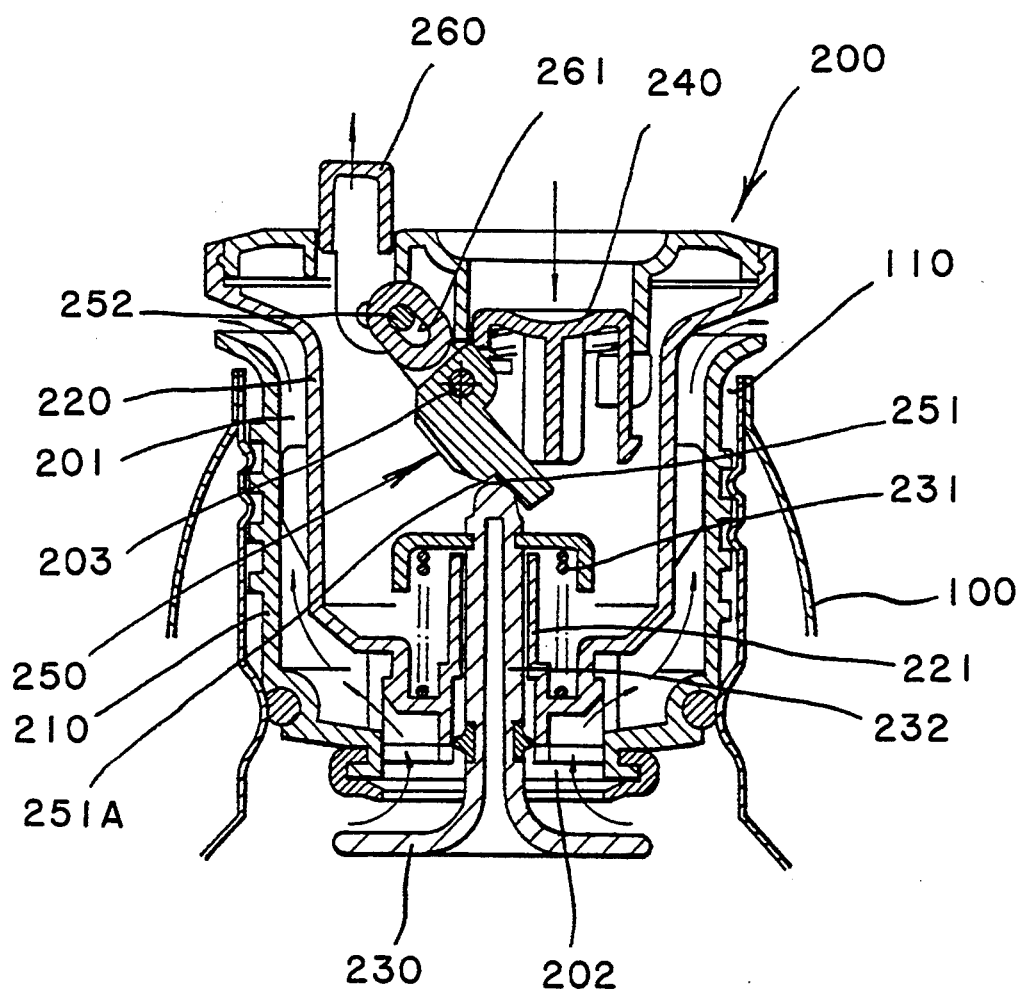
FIG. 3 is a cross sectional view showing an open position of the discharging path opening/closing device of the vacuum bottle of the present invention.
Figure 4:
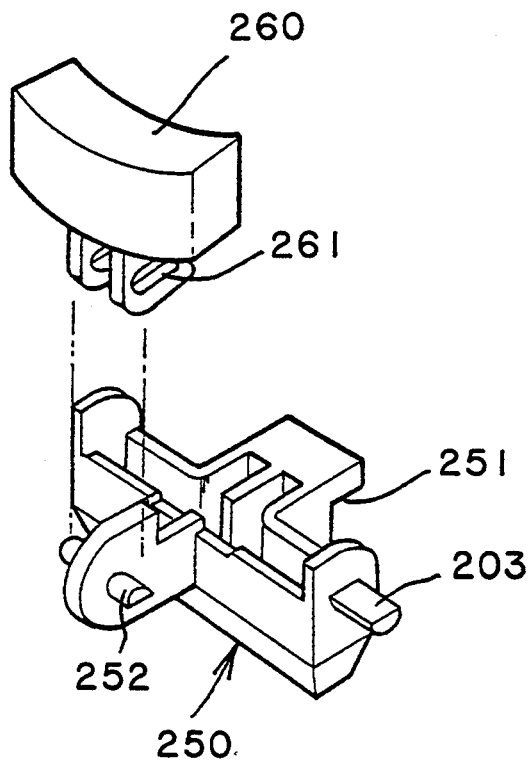
FIG. 4 is a perspective view of an opening and closing member applied to the discharging path opening/closing device of the vacuum bottle of the present invention.

When the content of the vacuum bottle is intended to be used while carrying the vacuum bottle in this state, as shown in FIG. 3, the cap 300 is taken off and then, when the path opening button 240 provided on the top surface of the stopper 200 is pressed down, the ascending force of the path opening button 240 is changed to a linear movement and simultaneously the valve seat 230 is raised and the discharging opening 202, which has been closed, is opened. The discharging of the content now becomes possible. In this condition, the path closing button 260 provided at another side of the top surface of the stopper 200 is protruded or raised on the top surface of the stopper oppositely to the descending of the path opening button 240. Thus, the open position of the discharging opening is indicated or apparent and a closing operation is now ready to be made.

Therefore, the operating arm 250 mechanically couples the path opening button 240, the valve seat 230, and the path closing button 260 to each other, and drives them in a seesaw manner. There is cooperative movement between the path opening button 240 and the path closing button 260 and the opening and closing operation of the discharging opening becomes smooth and stable.

Since the height of the path closing button 260 is as high as possible, other peripheral components do not get in the way of the opening operation of the path opening button 240. Thus, open position of the discharging opening is immediately indicated.

Figure 5:
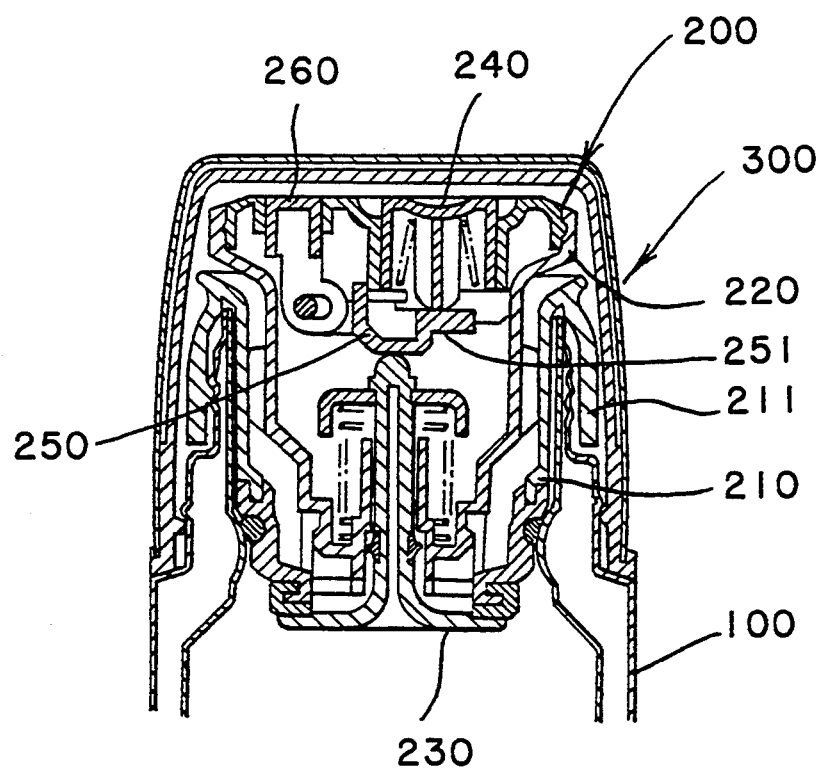
FIG. 5 is a cross sectional view showing another embodiment of a discharging path opening/closing device of the vacuum bottle of the present invention.

FIG. 5 shows another embodiment of the present invention. In this embodiment, the stopper 200 structure is different. It is constructed such that a top end portion of the external body 210 is extended and a protecting wall 211 surrounding the charging and discharging opening 110 of the main body 100 is integrally provided. A spiral line for coupling to the circumferential wall within the protecting wall 211 is provided.

As described above, although the preferred embodiments of the present invention are described, the present invention is not limited by these and any changes within the scope of claims defined below will be possible.

What is claimed is:

1. A stopper opening and closing device for a portable vacuum bottle, the vacuum bottle having a main body, and a storage chamber therein with a vacuum insulating circumferential wall, a closing stopper at a discharging opening of the main body, the closing stopper having a discharging path and an opening therein, a valve seat in the discharging path movable between an open and closed position, a path opening button for moving the valve seat into the open position, a path closing button for moving the valve seat into the closed position, the opening and closing buttons being operable from a top surface of the stopper, an operating arm located within the stopper, the operating arm having one end located so as to be within a path of movement of the path opening button so that movement of the path opening button moves the operating arm, the operating arm being in contact with the valve seat such that when the path opening button is depressed, movement of the operating arm moves the valve seat into the open position.

2. A stopper for a portable vacuum bottle as claimed in claim 1 wherein the path closing button acts on an opposite end of the operating arm to move the operating arm, the operating arm, when acted upon by the path closing button, moving the valve seat into the close position.

3. A stopper as claimed in claim 1 further comprising a lock groove on the operating arm whereby the operating arm, when acted upon by the path opening button, maintains the valve seat in the open position.

* * * * *